United States Patent [19]

Bscheider

[11] Patent Number: 5,196,831
[45] Date of Patent: Mar. 23, 1993

[54] ELECTRIC SWITCHGEAR EQUIPMENT WITH DETECTION OF UNAUTHORIZED CHANGES TO THE SETPOINTS

[75] Inventor: Jose Bscheider, Plainville, Conn.

[73] Assignee: General Electric Company, New York, N.Y.

[21] Appl. No.: 732,529

[22] Filed: Jul. 19, 1991

[51] Int. Cl.⁵ ............................................. G08B 21/00
[52] U.S. Cl. ................................... 340/638; 340/635; 335/17
[58] Field of Search ............... 340/635, 638, 657, 664; 335/17; 361/93, 96

[56] References Cited

U.S. PATENT DOCUMENTS

| | | | |
|---|---|---|---|
| 4,468,714 | 8/1984 | Russell | 361/62 |
| 4,583,232 | 4/1986 | Howell | 375/8 |
| 4,672,501 | 6/1987 | Bilac et al. | 361/96 |
| 4,991,042 | 2/1991 | Tokarski et al. | 361/93 |

Primary Examiner—Jin F. Ng
Assistant Examiner—Jeffery A. Hofsass
Attorney, Agent, or Firm—Richard A. Menelly

[57] ABSTRACT

Low voltage electric switchgear equipment includes a central processor unit electrically interconnected with electronic main and branch circuit interrupters within the same enclosure and used within a multi-phase power distribution circuit. A terminal connector block is connected by cable with each of the electronic trip units within the branch circuit interrupters to provide communications between the branch circuit interrupters and the main circuit interrupter for continuously updating the status of the branch circuit interrupters and their associated electrical equipment. An operating program within the central processor unit determines whether unauthorized changes to the setpoints stored within individual branch circuit interrupters have occurred and immediately provides indication of such changes.

5 Claims, 3 Drawing Sheets

ELECTRIC SWITCHGEAR EQUIPMENT WITH DETECTION OF UNAUTHORIZED CHANGES TO THE SETPOINTS

BACKGROUND OF THE INVENTION

The advent of "smart" circuit interrupters, such as described within U.S. Pat. No. 4,672,501 permits several such circuit interrupters arranged within a common enclosure to communicate with a central processor unit over a power line communication network or a twisted pair of conductors. The central processor is in the form of a field programming unit which continuously interrogates each of the interconnected circuit interrupters to determine the status of the individual circuit interrupter setpoint parameters as well as to determine whether a circuit interrupter has responded to interrupt circuit current to an associated piece of electrical equipment. An operator could then readily determine from the field programming unit which of the circuit interrupters has responded and the nature and magnitude of the overcurrent condition causing the circuit interrupter to respond.

In certain industrial environments it is customary to assemble a main circuit interrupter along with several branch circuit interrupters within a common enclosure such as within low voltage switchgear applications. The field programming unit is arranged within the enclosure and is interconnected with the main and branch circuit interrupters by means of a communications link to allow the condition and status of each of the circuit interrupters and the associated protected electrical equipment to be continuously monitored. The branch circuit interrupters communicate with the field programming unit and the main circuit interrupter for a variety of functions including Zone Selective Interlock. With Zone Selective Interlock function such as described, for example, in U.S. Pat. No. 4,468,714, an upstream circuit interrupter is delayed from operating to interrupt circuit current to allow a downstream circuit interrupter closer to the fault to interrupt the circuit. The trip-time characteristics of the individual branch circuit interrupters can be independently adjusted to insure that the circuit interrupter closest to the fault will interrupt before any of the upstream circuit interrupters. The use of such a communications link between the main and branch circuit interrupters within a common enclosure is described within U.S. patent application Ser. No. 674,475, filed Mar. 25, 1991, entitled "An Electronic Circuit Interrupter With Attached Terminal Connector Block". A good description of a transceiver for communicating between the circuit interrupters and the field programming unit is found within U.S. Pat. No. 4,583,232.

When the distributed branch circuit interrupters are adjusted for Zone Selective Interlock function, it is essential that the setpoints within the individual circuit interrupters are not changed. In many cases, the unauthorized changes to the branch circuit interrupters are only discovered after an interrupter has tripped unnecessarily or has failed to trip within the designed setpoint time or current parameters.

Accordingly, one purpose of the invention is to determine whether unauthorized changes to stored setpoint data within interconnected electronic circuit interrupters and a field programming unit have occurred and provide immediate indication of such changes to the field programming unit.

SUMMARY OF THE INVENTION

Switchgear equipment consisting of a plurality of distributed circuit interrupters interconnected with each other and with a field programming unit is continuously interrogated to determine unauthorized changes to the setpoints stored therein. A program within the field programming unit continuously compares the setpoints stored within the individual circuit interrupters to originally stored setpoints within the field programming unit and immediately provides indication that a change has occurred.

DESCRIPTION OF THE PREFERRED EMBODIMENT

Figure 1:
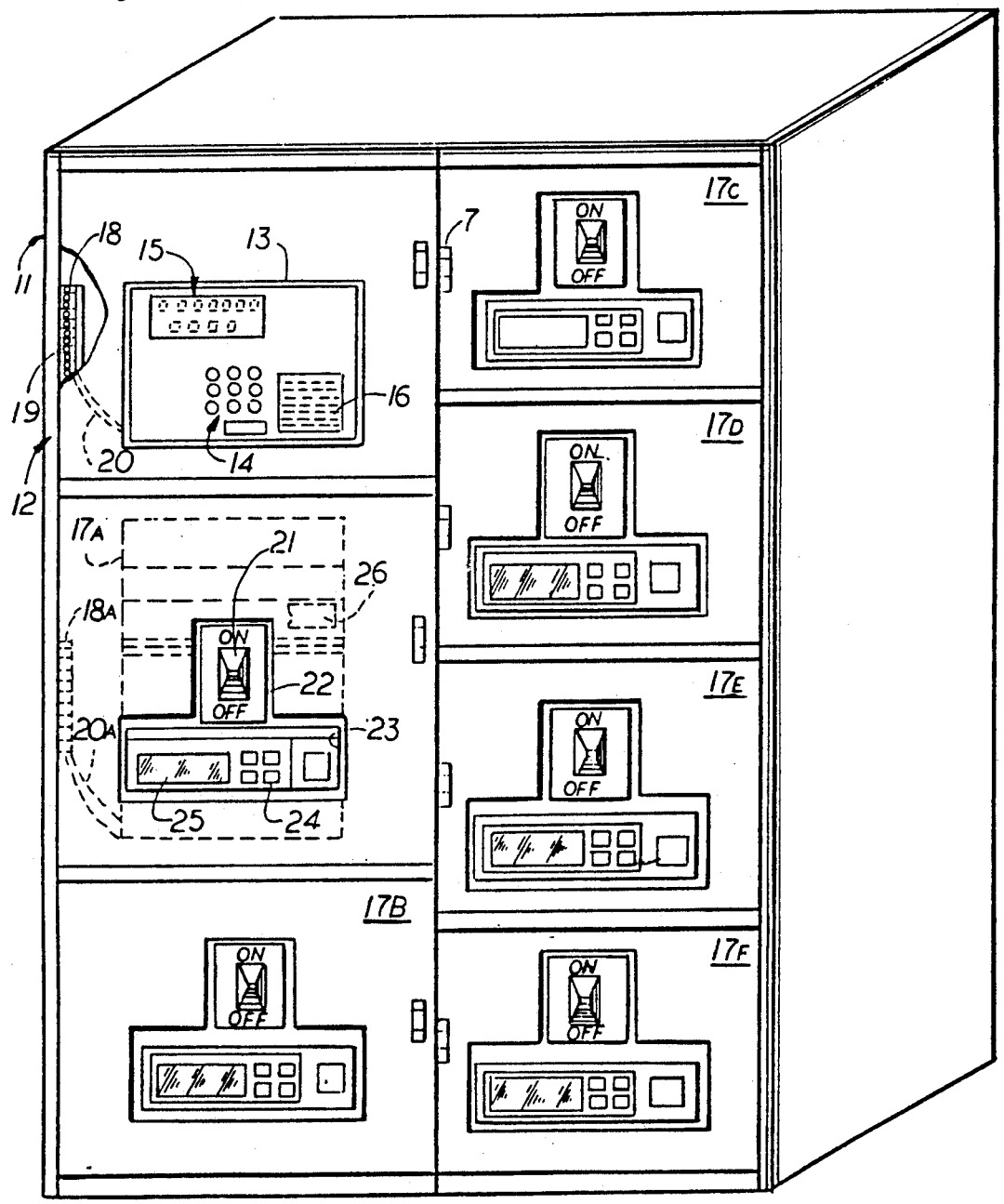
FIG. 1 is a front view of a switchgear equipment enclosure containing individual circuit interrupters interconnected with each other and with a field programming unit according to the prior art.

A low voltage switchgear assembly 10 is shown in FIG. 1 and consists of a metal enclosure 11 that is subdivided into a plurality of individual compartments 12. The field programming unit 13 is arranged within one of the compartments such that the keypad 14 and display 15 are accessible from the exterior of the enclosure. Indicia 16 provide instructions for displaying the status and setpoint information stored within each of the circuit interrupters 17A–17F arranged within separate compartments. The circuit interrupters are similar to those described in U.S. Pat. No. 4,991,042 and each includes an operating handle 21 accessible from the exterior of the compartment for inputting and reviewing the setpoint data stored within the circuit interrupter electronic trip unit. An inverted T-shaped slot 23 is formed through each of the compartments 12 through which the handle escutcheon 22, handle operator 21, keypad 24 and display 25 project. The rating plug 26 that sets the circuit interrupter ratings is only accessible by means of the compartment handle, such as indicated at 7 and which can be padlocked to prevent access to the circuit interrupter rating plug and also to the terminal connector block 18 that is mounted on the side wall of the enclosure 11. The terminal connector block includes a plurality of terminal connectors 19 and connects with the field programming unit 13 as well as with the individual circuit interrupters 17A–17F by means of cables 20. Each of the individual circuit interrupters has a corresponding terminal connector block such as indicated at 18A which is connected with its associated circuit interrupter by means of a separate cable as indicated at 20A. As described earlier, the electrical interconnection by means of the individual terminal connector blocks 18 allows the field programming unit to continuously interrogate the interconnected circuit interrupters to determine the status of the individual setpoint parameters and to also determine whether any of the circuit interrupters has responded to interrupt the circuit current to an associated piece of electrical equipment. Although the circuit interrupter and associated terminal block are described herein for use within switchgear equipment, this is by way of example only. The circuit interrupter can be mounted, per se, outside an electrical enclosure for communication with distant circuit interrupters over a power line communications network for a variety of data acquisition, interlock and metering functions.

Figure 2:
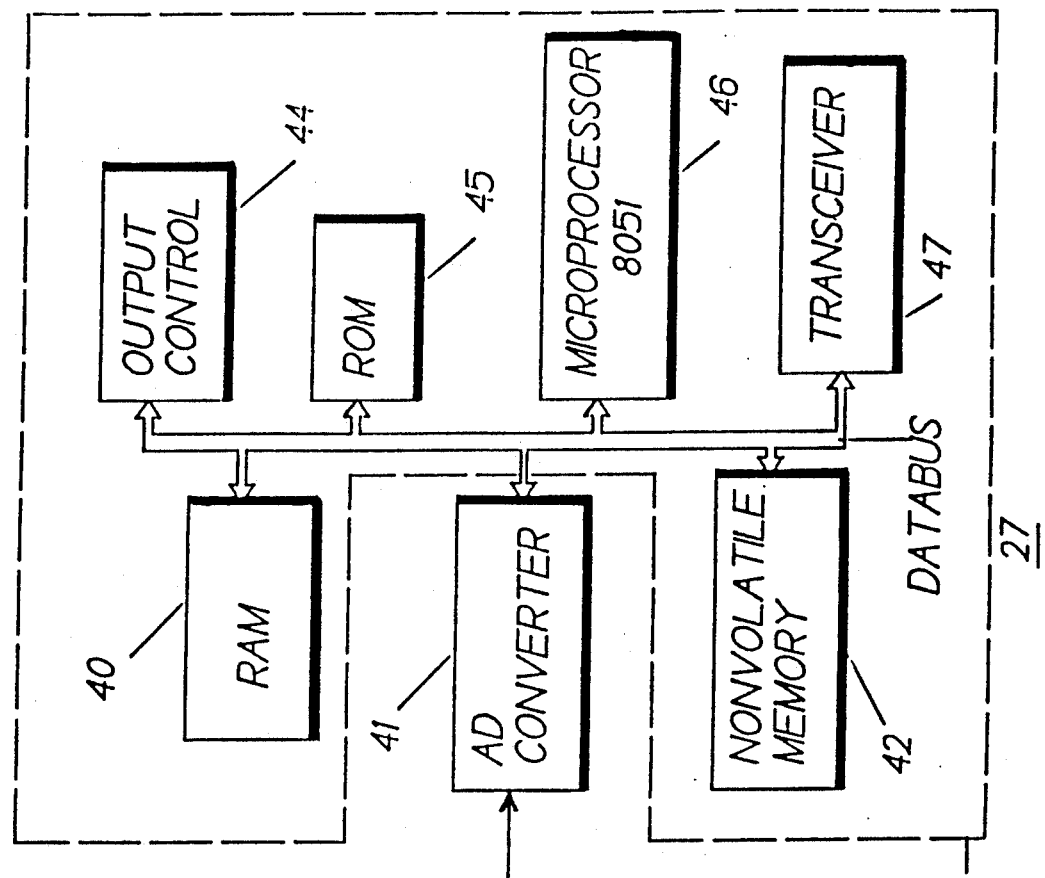
FIG. 2 is a schematic representation of the trip circuit used within the prior art circuit interrupters of FIG. 1.
Figure 2:
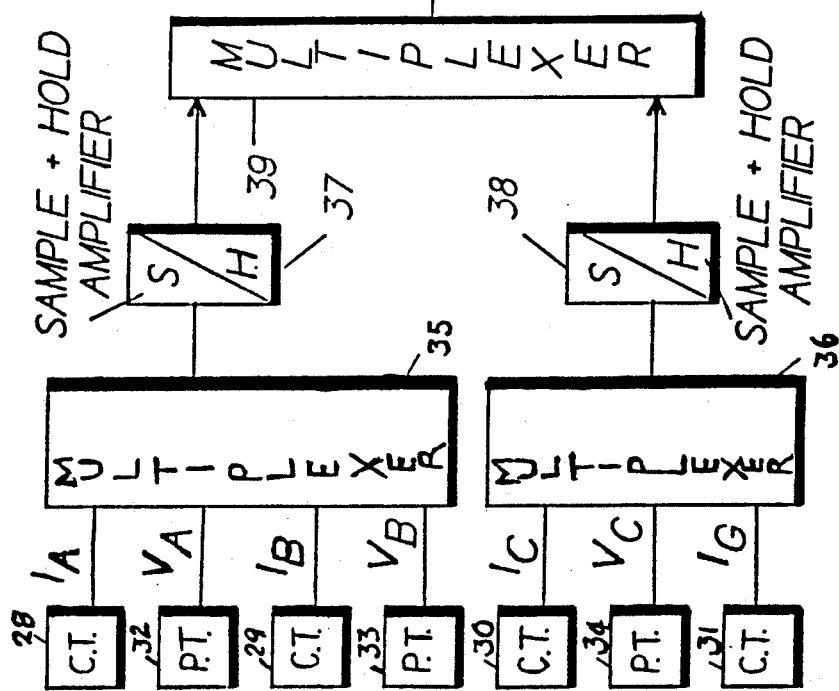

The trip circuit 27, as depicted in FIG. 2, comprises the electrical connection with a plurality of current transformers 28, 29, 30, 31 and potential transformers 32-34 which connect through a pair of multiplexers 35, 36 and sample and hold amplifiers 37, 38 to a second multiplexer 39. The output of multiplexer 39 connects to a data bus through an A/D converter 41. The circuit operates in a manner similar to that described within U.S. Pat. No. 4,672,501, wherein the circuit breaker setpoints are stored in the RAM memory 40 and the circuit breaker operating programs for the microprocessor 46 are stored in the ROM memory 45. The Non-Volatile Memory 42 stores information such as metering data. The data bus connects with the other circuit interrupters by means of the transceiver 47. The output control 44 responds to the instructions received from the microprocessor to interrupt the circuit current when the setpoint values are exceeded. Although each of the distributed circuit interrupters 17A-17F of FIG. 1 include the trip circuit 27, only the subcircuit 48 is contained within the field programming unit. As further described in the aforementioned U.S. Pat. No. 4,672,501, the setpoint information is inputted to each of the distributed circuit interrupters by means of the field programming unit. As best seen by referring back to FIG. 1, the keypad 24 on each of the circuit interrupters allows the circuit interrupters to be interrogated and displays the results on the display 25. When the switchgear 10 is arranged for Zone Selective Interlock Function, it is important that the setpoints within the distributed circuit interrupters remain unchanged.

Figure 3:
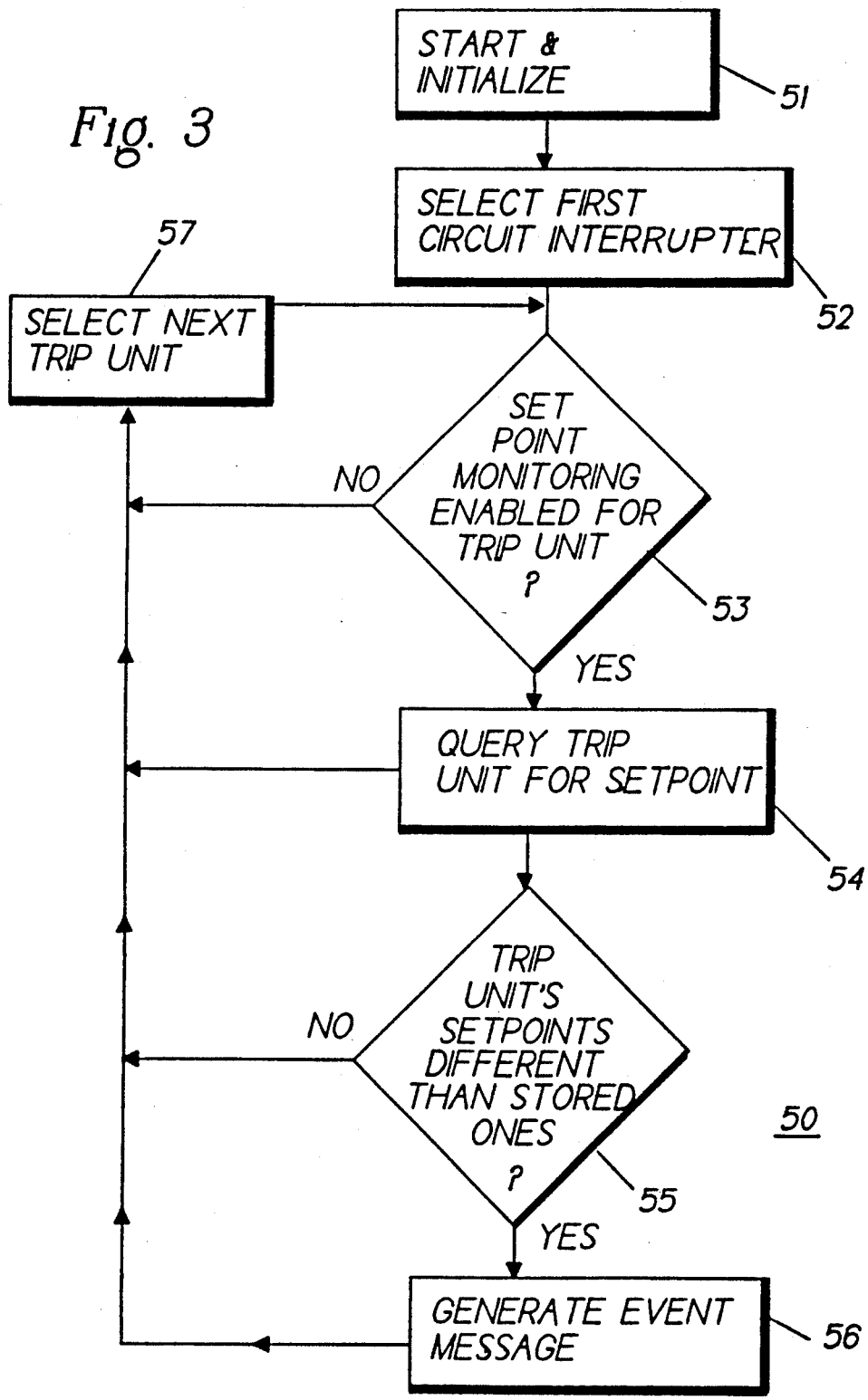
FIG. 3 is flow chart representation of an unauthorized setpoint determination program.

The flow chart 50, depicted in FIG. 3, provides a method of detecting and recording any unauthorized changes to the circuit interrupter setpoints as follows. The field programming unit is initialized (51) and a first circuit interrupter trip unit is selected (52). A determination is made as to whether the setpoint monitoring program within the field programming unit was enabled for the first selected trip unit (53) and if not, the next circuit interrupter trip unit is interrogated (57). In the event that the circuit interrupter trip unit setpoint monitoring was enabled, the circuit interrupter trip unit is queried to determine the most recent setpoints (54). A determination is next made as to whether the circuit interrupter trip unit setpoints compare to the setpoints stored within the field programming unit for that particular circuit interrupter (55). If the current setpoints are different from the stored setpoints for the same circuit interrupter trip units, an event is recorded and a message is generated (56) and displayed at the field programming unit. If the circuit interrupter trip unit setpoints do not differ from the originally assigned values, the next circuit interrupter trip unit is selected, and the cycle is repeated.

Although access to the setpoints stored within the individual circuit interrupter trip units is possible by the method described within U.S. Pat. No. 4,991,042, for example, it is important that the change in the original setpoints be recorded at the field programming unit to insure that the setpoint change does not affect the other circuit interrupter functions. The invention accordingly provides a program whereby such changes are determined and the results of such changes are recorded and displayed at the field programming unit.

Having thus described my invention, what I claim as new and desire to secure by Letters Patent is:

1. A method of deterring unauthorized setpoint change in electronic trip circuit interrupters comprising the steps of:
   providing a central processor unit a plurality of circuit interrupters having electronic trip units;
   providing a communication link between each of said circuit interrupters and said central processor unit;
   recording original setpoint data within each of said electronic trip units and within said central processing unit;
   periodically comparing said original setpoint data to real time setpoint data within said electronic trip units; and
   displaying indication of any difference between said real time setpoint data and said original setpoint data.

2. The method of claim 1 including the step of providing data entry means, memory and display means to said central processor unit.

3. The method of claim 1 including the step of providing each of said trip units with a ROM for storing said real time and said original setpoint data.

4. The method of claim 1 including the step of providing a power line communication network or a twisted pair of conductors to said communication link.

5. The method of claim 2 including the step of displaying said difference indication at said central processor display means.

* * * * *